June 25, 1963
D. R. COSTELLO
3,095,099
SELF-LOADING FLAT-BED TRUCK
Filed Feb. 8, 1961
3 Sheets-Sheet 1
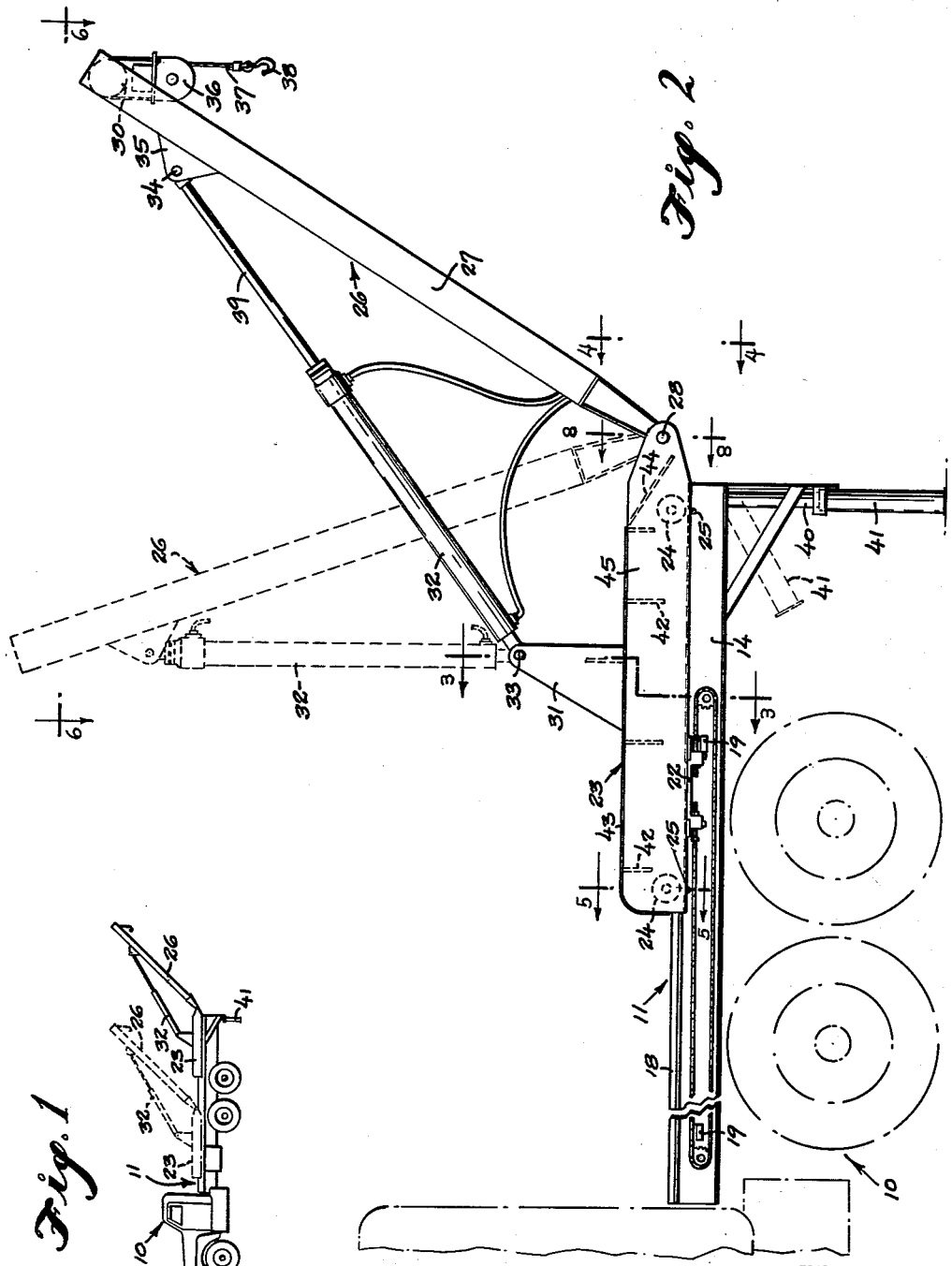
INVENTOR.
DANIEL R. COSTELLO
BY
ATTORNEYS June 25, 1963  D. R. COSTELLO  3,095,099
SELF-LOADING FLAT-BED TRUCK
Filed Feb. 8, 1961  3 Sheets-Sheet 2
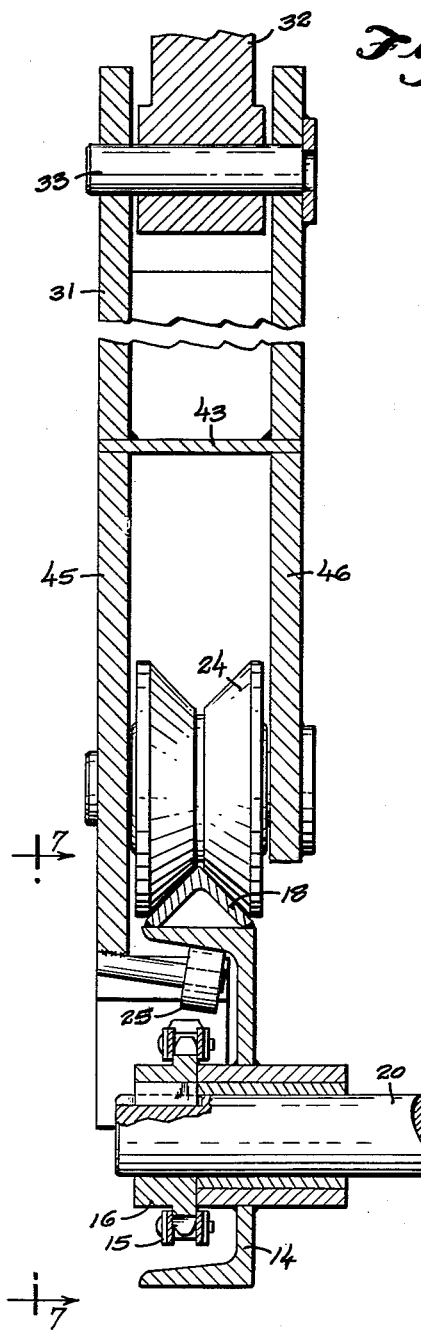
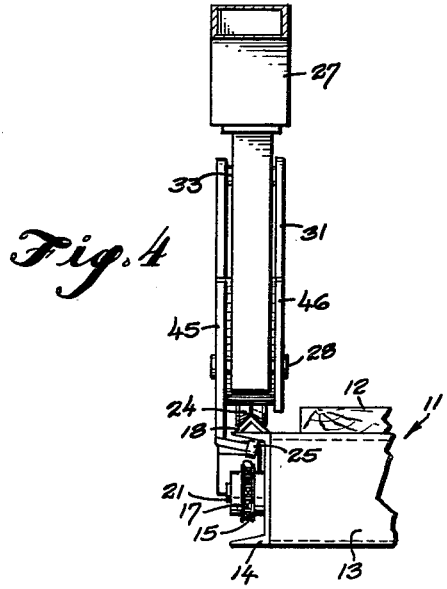
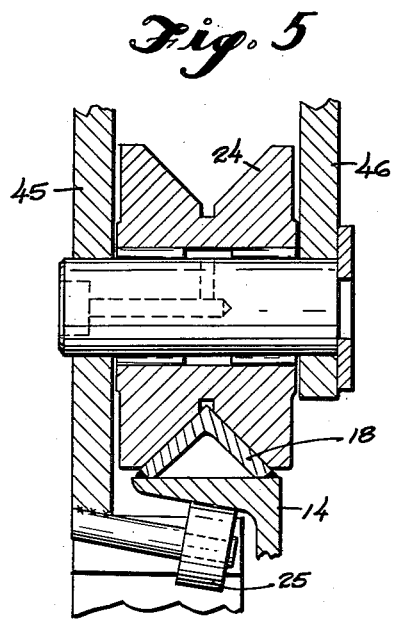
INVENTOR.
DANIEL R. COSTELLO
BY
ATTORNEYS

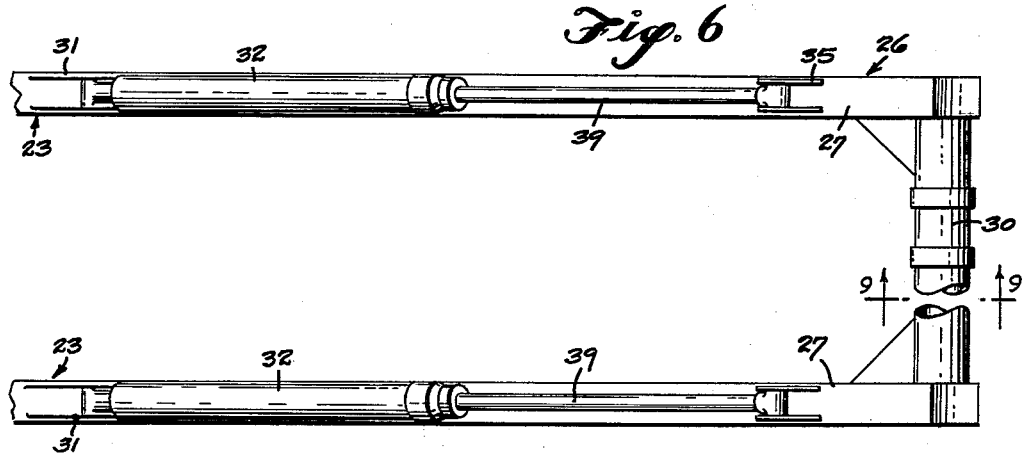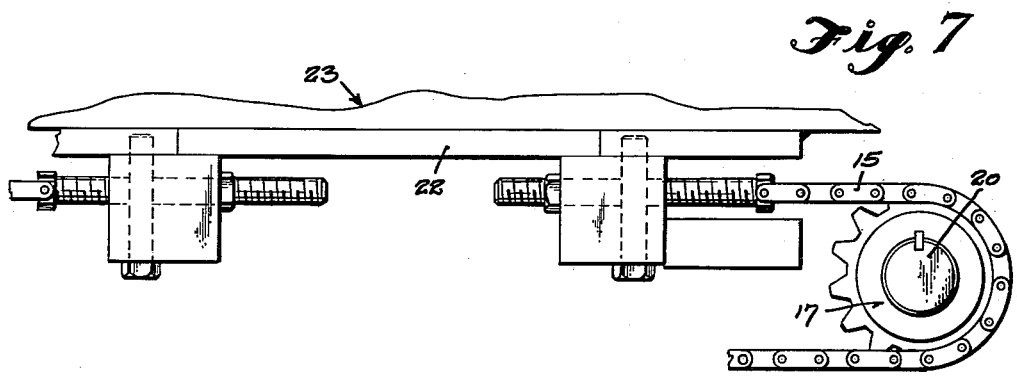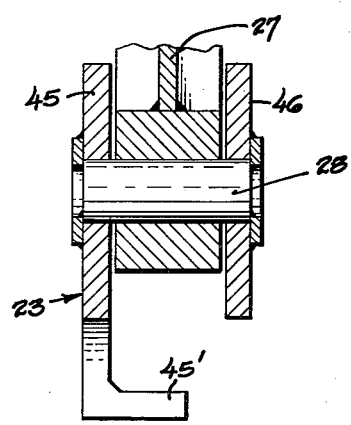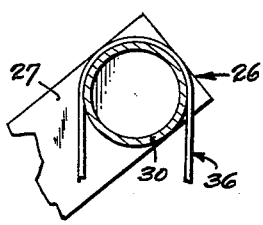

United States Patent Office 3,095,099
Patented June 25, 1963

3,095,099
SELF-LOADING FLAT-BED TRUCK
Daniel R. Costello, 20028 15th NE., Seattle, Wash.
Filed Feb. 8, 1961, Ser. No. 87,883
3 Claims. (Cl. 214—77)

This invention relates to a flat-bed truck of the type having a hoist constructed as a permanent adjunct thereof so that the truck is made self-sufficient for placing heavy loads upon and removing the same from the flat bed.

For its general object the invention aims to provide a self-loading truck of the character in which the loads are taken over the back, one in which loads can be precisely placed upon the truck and in which the loading and unloading operations can be handled with ease and expedition, and which is otherwise perfected by providing a structure which is strong and durable and of comparatively simple and inexpensive construction.

More particular objects and advantages, with the foregoing, will appear and be understood in the course of the following description and claims, the invention consisting in the novel construction and in the adaptation and combination of parts hereinafter described and claimed.

In the accompanying drawings:

FIGURE 1 is a side elevational view illustrating a self-loading truck constructed to embody the preferred teachings of the present invention. The load-handling structure includes a carriage mounted for reciprocal movement longitudinally of the truck's load-carrying bed, and full and broken lines are employed to indicate such carriage in two positions of its permitted travel.

FIG. 2 is a fragmentary side elevational view of the truck drawn to an enlarged scale and here employing full and broken lines to indicate two positions occupied by a swingably mounted yoke which bridges the load-receiving deck and from which loads are suspended in course of moving the same to and from the truck bed.

FIG. 3 is a fragmentary transverse vertical sectional view drawn to an enlarged scale on line 3—3 of FIG. 2.

FIG. 4 is a fragmentary transverse vertical sectional view drawn to a somewhat smaller scale on line 4—4 of FIG. 2.

FIG. 5 is a fragmentary transverse vertical sectional view on line 5—5 of FIG. 2 and employing a scale somewhat larger than that of FIG. 3.

FIG. 6 is a fragmentary top plan view of the yoke and the associated hydraulic jacks of the load-handling structure, deleting any showing of the truck body, the vantage point for the view being shown at 6—6 of FIG. 2. The scale used is larger than that of FIG. 2 and smaller than the scale of FIG. 4.

FIG. 7 is a fragmentary side elevation viewed from the vantage point shown at 7—7 in FIG. 3.

FIG. 8 is a fragmentary transverse vertical sectional view drawn to an enlarged scale on line 8—8 of FIG. 2; and FIG. 9 is a fragmentary longitudinal vertical sectional view drawn to an enlarged scale on line 9—9 of FIG. 6.

Referring to said drawings the numeral 10 denotes a truck providing a load-carrying body 11 of the flat-bed type. The structural nature of this body is not critical and I have here shown the same as comprising a plank deck 12 laid on cross-joists 13 and having these joists joined along each of the two sides by longitudinal channels 14. The channels face outwardly and in each instance house a chain 15 trained about respective front and rear sprocket wheels 16 and 17, respectively, both of which are fast to cross-shafts, as 20 and 21, respectively. Shaft 20 is a live shaft common to both chains and is driven in either direction, selectively, preferably by a reversing hydraulic motor (not shown) drawing pressure fluid from a pump which is in turn powered from the engine of the truck. The two ends of each chain are adjustably anchored to a respective bracket 22 welded or otherwise rigidly secured to a respective one of two carriages 23.

The two carriages are mirrored counterparts of one another and each tracks upon a respective rail 18 welded or otherwise rigidly secured in a surmounting position upon the top edge of a related one of the two channels 14. The rails are desirably comprised of angle-iron stock placed face-down so that flanking walls slope downwardly in opposite directions from a centered vertex. A wheel 24 journal-mounted at each of the two ends of each carriage rides upon the related rail, and each said wheel is complemented by a respective roller 25 which bears upon the underside of the top flange of the related channel 14. Stops 19 rigid with the channel members of the vehicle frame are engaged by the brackets 22 to prescribe end limits of travel for the carriages.

A swing-frame 26 formed to a yoke shape extends transversely of the truck body from the carriage at one side to the carriage at the other side, with each of the two legs 27 of such yoke pivoted by its free end, as at 28, to the after end of the related carriage for fore-and-aft swing movement of the bridging cross-arm 30 about a transverse horizontal axis. This fore-and-aft movement is controlled by hydraulic cylinder-and-piston assemblies, one for each of the two sides of the yoke, extending between a related leg and a stool 31 surmounting the concerned carriage. The cylinder 32 of said assembly pivots, as at 33, to the stool. The piston rod 39 pivots, as at 34, to a bracket 35 which is fixed to the leg of the yoke. The yoke desirably has an approximate 60° swing arc more or less equally divided fore and aft of a perpendicular raised from the pivot center.

A winch 36 powered by a reversible hydraulic motor is carried by the cross-arm of the yoke, being arranged for transverse movement relative thereto. A cable or chain 37 wound on the winch drum is fitted with a terminal hook 38.

At each of the two rear corners of the truck bed there is provided a stabilizing foot movable at will between operative and inoperative positions shown by full and dotted lines in FIG. 2. Each said foot is comprised of two telescopically associated members 40 and 41. The inner said member is pivoted to the truck bed. While not shown the outer said member provides a through-bore arranged to be brought into register with a selected one of several holes provided in the inner member. An anchor pin is inserted through the registering holes.

The two carriages and their surmounting stools are or may be fabricated from plate stock, the structure as here shown comprising paralleling vertical cheek-plates 45 and 46 joined at intervals of the length by web sections 42 and having the wheels guarded by a cover plate 43 and a biased extension 44 thereof. As to the yoke, the cross-arm is desirably pipe stock while the two legs are or may be hollow box sections with I-beam feet.

In use the bridging cross-arm of the yoke is swung into the position shown by full lines in FIG. 2 when a load is to be picked up. As above described the winch hoist is a travelling unit in the sense of being movable transversely at will. The load is elevated by the winch in a degree sufficient to clear the truck bed and is then swung forwardly into the dotted-line position of FIG. 2 by introducing pressure fluid from the pump of the hydraulic system to the outer end of the cylinders 32. The live shaft 20 is now operated so as to move the carriages forwardly and the load is lowered onto the truck bed at the position desired, it being usual to load the truck progressively from front to back. The procedure is reversed when the truck arrives at the site for which the load is destined. In transit it is desirable that the yoke and carriage occupy the positions shown by dotted lines in FIG. 1. The yoke in this position lies wholly to the front of the tail limit of the truck bed. The pistons of the piston-and-cylinder assemblies perform their own positive stop function in that the same have here reached the outer extreme of their permitted reciprocal travel.

While not here illustrated the stabilizing feet can, if desired, be hydraulically operated. In such case a preferred arrangement is one in which the member 40 functions as the hydraulic cylinder, with the member 41 being sleeved thereon and connecting by its lower end with the piston rod of a piston working in the cylinder. The cylinder would be double-acting.

It is thought that the invention will have been clearly understood from the foregoing detailed description of my now-preferred illustrated embodiment. Changes in the details of construction can perforce be adopted without departing from the spirit of the invention and it is accordingly my intention that no limitations be implied and that the hereto annexed claims be given a scope fully commensurate with the broadest interpretation to which the employed language fairly admits.

What I claim is:

1. In combination with a wheeled vehicle having a load-receiving flat bed extending between outwardly facing longitudinal channel members of a vehicle frame, a respective rail extending longitudinally of the bed in surmounting relation to said channel member, a respective carriage providing wheels at the front and rear ends riding upon each of said rails, rollers journaled from each of the carriages bearing upon the underside of the upper flange of the related channel to counter forces imposed upon the carriages tending to up-end the same, a respective set of front and rear sprocket wheels journaled at each side of the bed for rotation about transverse horizontal axes which coincide as between the two sets, a respective chain for each of said sets trained about the sprocket wheels and dead-ended to the related carriage, said chains and the sprocket wheels about which they are trained being wholly housed by the related channel member of the frame in the space between the channel flanges, power-driven means for turning said two sets of sprocket wheels in unison in either direction selectively for moving the carriages along the rails, a unitary swing-frame formed to a yoke shape so as to provide upright side arms connected across the top by a bridging cross-arm and having the lower ends of said side arms co-axially pivoted one to one and the other to the other of the two carriages for fore-and-aft swing movement about a transverse horizontal axis, hoist means carried by the cross-arm of the swing-frame, and power-operated means for moving said swing-frame in its said swing movement.

2. Structure according to claim 1 in which the carriages are each comprised of an open-bottom elongated box forming a housing for the carriage wheels and having the side walls of said box body prolonged rearwardly beyond the rear wheel, the legs of the swing-frame being journaled between said prolongations of the side walls of a related said carriage, the power-operated means for swinging the swing-frame comprises, for each side of the swing-frame, a respective hydraulic double-acting cylinder-and-piston jack extending between the upper end of a related side arm and a stool surmounting the related carriage at a point midway between the front and the rear wheels thereof.

3. Structure according to claim 1, the rails being sectionally of an inverted-V shape to present flank walls diverging downwardly from a median crest, the wheels having a mating profile configuration so as, by tracking engagement upon said flank walls, to hold the wheels against lateral displacement from the rails, said rails having their side edges welded to the related channel members so as to be integral therewith.

References Cited in the file of this patent

UNITED STATES PATENTS

| | | |
|---|---|---|
| 1,791,663 | Edson | Feb. 10, 1931 |
| 1,986,413 | Ruemelin | Jan. 1, 1935 |
| 2,696,925 | Le Laurin | Dec. 14, 1954 |
| 2,798,267 | Anderson | July 9, 1957 |
| 2,911,118 | Tapp | Nov. 3, 1959 |
| 2,925,922 | Frenzel | Feb. 23, 1960 |
| 2,941,678 | Keys | June 21, 1960 |